United States Patent Office 2,728,620
Patented Dec. 27, 1955

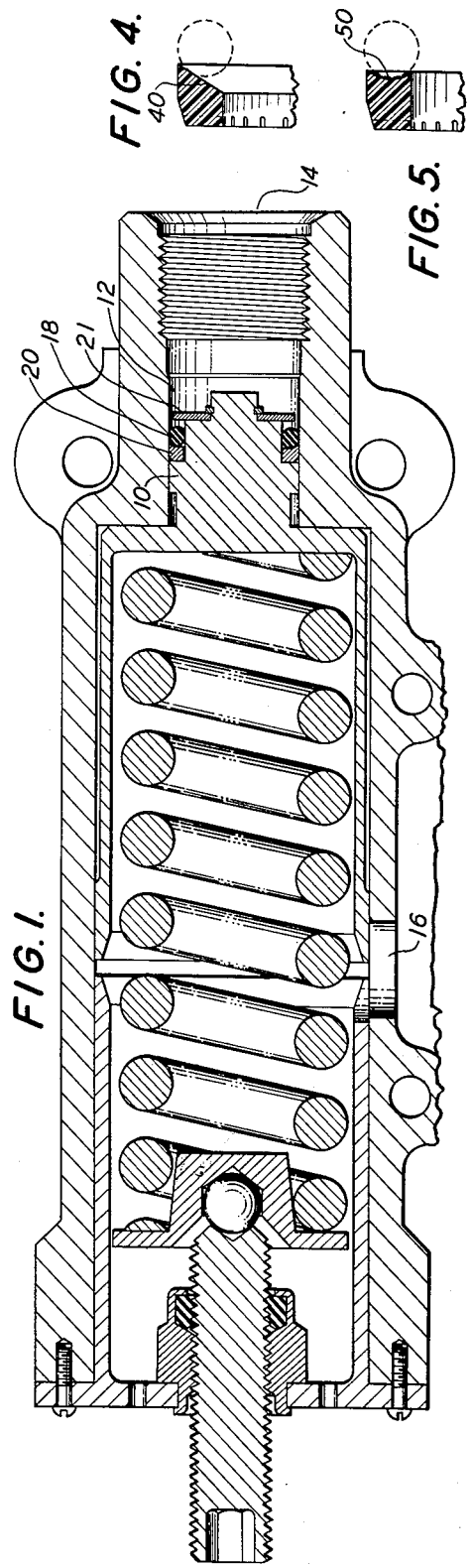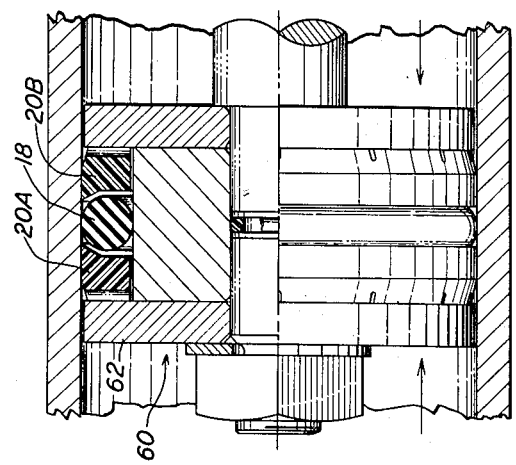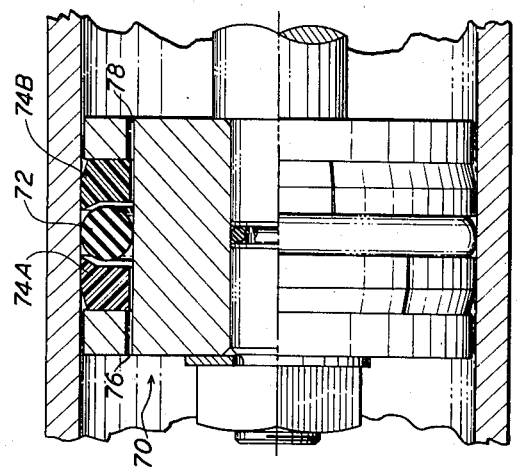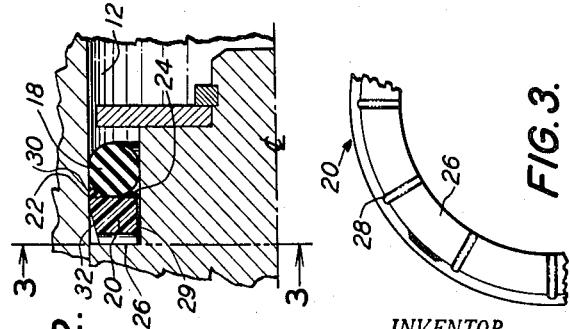
Dec. 27, 1955   R. E. KRUEGER   2,728,620
PRESSURE SEALS
Filed May 6, 1952
INVENTOR.
RUDOLPH E. KRUEGER
BY James B. Christie
ATTORNEY

2,728,620
PRESSURE SEALS

Rudolph E. Krueger, Burbank, Calif., assignor to Wallace O. Leonard, Inc., Pasadena, Calif., a corporation of California Application May 6, 1952, Serial No. 286,288

3 Claims. (Cl. 309—23)

This invention relates to improved pressure seals, and particularly to improved backings for use with resilient pressure seals.

Conventional pressure seals employ an O-ring composed of a resilient material such as rubber for providing a seal for the fluid involved. Such O-ring seals are usually provided with annular back-up rings located on one or both sides of the O-rings so as to preclude extrusion and excessive wear of the resilient O-rings when they are subjected to high pressures. Ordinarily the back-up rings are composed of a flexible material such as leather, and they are of rectangular cross-section.

Such back-up rings are subject to extrusion and excessive wear when the seal is subjected to high pressures. Another difficulty is that the physical characteristics of the leather of which the back-up rings are composed vary so that no two rings function in the same manner. Also, the frictional losses caused by a seal of this type are rather large due to the fact that a large part of the forces which are transmitted by the seal to the surface on which it slides, are transmitted directly through the resilient O-ring which has a rather large coefficient of friction.

These difficulties are overcome, or at least greatly reduced, in the pressure seals of my invention by providing backings of special construction which serve to reduce the frictional losses caused by the seals, and which are not subject to extrusion and excessive wear when the seals are subjected to high pressures.

The back-up member of my invention is of such shape that a portion of the member extends between part of the resilient seal and the surface along which the seal slides, and preferably the back-up member is composed of a material having a coefficient of friction which is less than that of the resilient seal.

When fluid pressure is applied to the pressure seal, the portion of the back-up member which extends between part of the resilient seal and the surface along which the seal slides is forced against the surface so as to preclude extrusion of the resilient seal between the back-up member and the surface along which it slides. Also, a large part of the forces which are transmitted by the pressure seal to the surface along which the seal slides, are transmitted through the back-up member, rather than directly through the resilient seal itself. Since the coefficient of friction of the back-up member is less than that of the resilient seal, frictional losses are reduced.

It is desirable that the back-up member have a beveled portion on the edge at which extrusion of the back-up member might occur, so as to preclude extrusion and excessive wear of that member also.

In an alternative embodiment of the invention, the face of the back-up member which engages the resilient seal is cupped, so that a portion of the back-up member extends between part of the resilient seal and the member which carries the seal and another portion of the back-up member extends between part of the resilient seal and the surface along which the seal slides. Such an arrangement precludes extrusion of the resilient seal between the backing and the member which carries the seal, as well as between the backing and the surface along which the seal slides.

The back-up members may be composed of various elastic materials. In a preferred embodiment, the members are composed of a stable synthetic plastic which has a low coefficient of friction and which is not adversely affected by high temperatures.

The invention is explained with reference to the accompanying drawings, in which:

Fig. 1 is a sectional view showing the pressure seal of my invention employed on a spring-loaded piston;

Fig. 2 is an enlarged view of a portion of Fig. 1 showing the pressure seal;

Fig. 3 is a view along line 3—3 of Fig. 2 showing one side of the back-up ring;

Figs. 4 and 5 are sectional views of alternative embodiments of the back-up ring;

Fig. 6 is a view, partially in section, of a pressure seal and a piston wherein back-up rings are employed on both sides of the seal; and Fig. 7 shows an alternative embodiment of the seal and piston shown in Fig. 6.

Fig. 1 shows the pressure seal of my invention employed to provide a seal between a spring loaded piston 10 and a cylinder 12. Pressurized hydraulic fluid is introduced through an inlet 14 to cause the piston 10 to move against the spring load. The piston may be employed to actuate various devices such as a switch, the operating mechanism of which may be introduced through an opening 16 in the housing for the device. Such an arrangement is disclosed in my application Serial No. 309,125 filed on September 11, 1952.

The pressure seal comprises an O-ring 18 and a back-up ring 20 which are secured between a shoulder on the piston and a retaining washer 21. The O-ring 18 may be a conventional type which is composed of a resilient material such as rubber.

Since the pressure seal in this embodiment of the invention is designed to provide a seal for fluid pressures which are applied to only one side of the seal, only one back-up ring is required for the O-ring.

Figs. 2 and 3 show the details of one embodiment of the back-up ring 20. The face of the back-up ring which engages the O-ring has a surface 22 which extends inwardly from the outer periphery of the ring and which slopes toward the interior of the ring, so that the portion of the back-up ring which is adjacent the surface 22 extends between part of the O-ring and the wall of the cylinder 12 along which the seal slides. As shown in Fig. 2, the surface 22 is straight in cross-section; however, it may be curved if desired. The remainder of the face of the back-up ring which engages the O-ring comprises a surface 24 which is disposed parallel to the plane of the back-up ring.

The opposite face of the back-up ring is provided with a substantially flat surface 26 for engaging a shoulder on the piston. Preferably a plurality of radially-extending grooves 28 are provided in the flat surface for ventilating the seal.

The inner periphery of the back-up ring has a surface 29 which is of cylindrical shape. The outer periphery of the back-up ring has a surface 30 which is of cylindrical shape, and the remainder of the outer periphery is beveled so as to provide a surface 32 of frusto-conical shape which serves to preclude extrusion of the back-up ring.

The back-up ring should be composed of a material which remains elastic over a wide range of temperatures, which is harder than that of the O-ring, and which has a coefficient of friction which is less than that of the O-ring with reference to the surface on which the pressure seal slides.

Preferably, the back-up ring is composed of a stable synthetic plastic such as polymerized tetrafluoro ethylene, which is known by the name Teflon. This material has a low coefficient of friction which is of the order of 0.1 with respect to metal surfaces, as compared to a coefficient of friction of the order of 0.45 for the rubber of which the O-ring is composed. Also, this material will bend and restore to normal, but it will not compress appreciably or flow under normal operating conditions. Thus, a back-up ring composed of this material will bend outwardly to completely seal the space between the piston assembly and the cylinder wall when pressure is applied, but it will not flow into this space. In addition, a stable synthetic plastic material such as Teflon will resist high temperatures, whereas conventional backings, such as leather, become hard and brittle when exposed to temperatures above 200° F. Stable synthetic plastic material will retain its shape after exposure to high temperatures, and the shape of the back-up rings of my invention serves to prevent excessive deflection of an O-ring even though the O-ring may have become hard and brittle due to exposure to high temperatures.

The plastic known as Kel-F is preferable if the pressure seal must operate at high pressures, as this material is approximately three times as hard as Teflon, but is still a stable plastic. However, this material is more expensive than Teflon, and Teflon is satisfactory for ordinary temperature ranges.

When pressurized hydraulic fluid is applied through the inlet 14 in the housing to the piston, the O-ring 18 is forced against the back-up ring 20, and the side of the resilient O-ring which is adjacent the back-up ring tends to assume the shape of the abutting face of the back-up ring.

The pressure which is applied through the O-ring to the inclined surface 22 on the back-up ring forces the outer peripheral surface 30 of the back-up ring against the wall of the cylinder 12, so as to preclude extrusion of the O-ring adjacent the wall of the cylinder.

The beveled surface 32 on the back-up ring precludes extrusion of the back-up ring between the piston and the wall of the cylinder for ordinary fluid pressures.

The grooves 28 in the back-up ring permit the escape of fluid which is entrapped between the O-ring 18 and the back-up ring and also serve to ventilate the seal.

The forces which are transmitted by the seal to the wall of the cylinder cause frictional losses. Due to the shape of the back-up rings of my invention and the material of which they are composed, frictional losses are less than the losses caused by conventional seals.

The portion of the back-up ring which is adjacent the surface 22 extends between part of the O-ring and the wall of the cylinder, so that a large part of the forces transmitted by the seal to the wall of the cylinder are transmitted through the back-up ring 20. Since the back-up ring has a coefficient of friction which is less than that of the O-ring, the frictional losses are less than they would be if most of the forces were transmitted directly through the O-ring to the wall of the cylinder, as is the case in conventional pressure seals.

The alternative embodiment of the back-up ring which is shown in Fig. 4 employs a continuously inclined surface 40 for engaging the resilient O-ring. Otherwise the structure of the back-up ring is the same as that disclosed in Figs. 2 and 3. This embodiment of the back-up ring serves to reduce frictional losses and to preclude extrusion of the O-ring in the same manner as discussed above with reference to Figs. 1 and 3. However, there is greater deformation of the resilient O-ring when the seal is subjected to high pressures, and hence the O-ring tends to wear more rapidly than is the case for the embodiment shown in Figs. 1 to 3.

When high fluid pressures are involved, there is some extrusion of the resilient O-ring seal between the wall of the piston and the inner periphery of the annular back-up ring. Ordinarily, such extrusion is not objectionable because there is relatively little movement of the O-ring on the piston. However, this extrusion of the O-ring can be prevented by providing the back-up ring with another inclined portion which extends between part of the O-ring and the piston.

The alternative embodiment of the invention shown in Fig. 5 discloses such a back-up ring. In this embodiment of the invention, the face of the back-up ring which engages the O-ring is provided with a cupped surface 50, so that a portion of the back-up ring extends between part of the O-ring and the member which carries the O-ring, in addition to the portion of the back-up ring which extends between part of the O-ring and the surface along which the seal slides.

Fig. 6 discloses a piston and seal arrangement which is suitable for use in applications in which pressurized fluid is applied to both sides of the piston.

Since the pressure seal must withstand pressures from either direction, a pair of back-up rings 20A and 20B are employed so as to provide backings for both sides of the seal. The piston 60 disclosed in this embodiment of the invention has an end 62 which can be removed in order to install the pressure seal. In such an arrangement it is preferable that the O-ring 18 and the back-up members 20A and 20B be continuous rings.

The embodiment of the invention shown in Fig. 7 employs a piston 70 which cannot be disassembled, and a split O-ring 72 and split back-up rings 74A and 74B are employed in this case.

A further difference in the back-up rings 74A and 74B is that ventilating grooves in the back-up rings have been eliminated. Vents 76 and 78 are provided in the piston itself for performing this function. Preferably a plurality of such vents are provided around each side of the piston so as to provide even ventilation for the seal.

It will be apparent that back-up rings of the type shown in Fig. 7 may be employed in the other embodiments of the invention if suitable means, such as vents in the piston, are provided for ventilating the seal.

Ventilation of the pressure seal is important when it is desired to minimize frictional losses. However, when the pressure seal is employed in hydraulic systems in which frictional losses are relatively unimportant, ventilation of the seal is unnecessary. In such applications, the grooves 28 in the back-up rings of my invention may be omitted, as is shown in the embodiment of Fig. 7 for example, and vents in the piston for providing ventilation of the seal are unnecessary.

I claim:

1. In a pressure seal having a resilient O-ring which is the primary sealing element, a back-up ring for the O-ring comprising an annular member which is substantially rigid along a direction perpendicular to the plane of the annular member, the back-up ring having a face for engaging the resilient O-ring and having a peripheral portion which extends between the resilient O-ring and the surface along which the seal slides, with the remaining portion of the face extending substantially parallel with respect to the plane of the annular member, the back-up ring being composed of a material having a coefficient of friction with respect to metal surfaces which is less than that of the resilient O-ring and having a hardness which is greater than that of the resilient O-ring, whereby the back-up ring provides a substantially rigid support for the resilient O-ring along the direction of fluid pressure, so that the peripheral portion of the back-up ring which extends between the resilient O-ring and the surface along which the seal slides is forced along a direction transverse to the direction of the fluid pressure and against the surface along which the seal slides to prevent extrusion of the resilient O-ring, and so that frictional losses are reduced because a large part of the forces which are transmitted through the pressure seal to the surface along which the seal slides are transmitted through the material of the back-up ring which has a coefficient of friction which is less than that of the resilient O-ring.

2. In a pressure seal having a resilient member which is the primary sealing element, a backing for the resilient member comprising a member which is substantially rigid along the direction of fluid pressure, the backing member having a face for engaging the primary sealing element and having a peripheral portion which extends between the primary sealing element and the surface along which the seal slides, with the remaining portion of the face being located in a plane disposed substantially parallel with respect to the plane of the seal, the backing member being composed of a material having a coefficient of friction with respect to metal surfaces which is less than that of the primary sealing element and having a hardness which is greater than that of the primary sealing element, whereby the backing member provides a substantially rigid support for the primary sealing member along the direction of fluid pressure, so that the peripheral portion of the backing member which extends between the primary sealing element and the surface along which the seal slides is forced along a direction transverse to the direction of the fluid pressure and against the surface along which the seal slides to prevent extrusion of the primary sealing element, and so that frictional losses are reduced because a large part of the forces which are transmitted through the pressure seal to the surface along which the seal slides are transmitted through the material of the backing member which has a coefficient of friction which is less than that of the primary sealing element.

3. A back-up ring for use in a pressure seal having a resilient member which is the primary sealing element, comprising an annular member which is substantially rigid along the direction of fluid pressure, the annular member having an inner peripheral surface which is of cylindrical shape, an outer peripheral surface with a portion of it being of cylindrical shape and the remainder of it being frusto-conical shape, the back face of the member extending from the peripheral surface of frusto-conical shape and being substantially flat and having radially-extending grooves in it for ventilating the seal, and the front face of the member having a surface which extends from and is disposed at an acute angle with respect to the cylindrical-shaped outer peripheral surface so as to extend between a portion of the resilient sealing member and the surface along which the seal slides, the remainder of the surface on the front face of the member being substantially flat and disposed substantailly parallel with respect to the plane of the annular member, the back-up ring being composed of Teflon having a coefficient of friction with respect to metal surfaces which is less than that of the primary sealing element and having a hardness which is greater than that of the primary sealing element, whereby the back-up ring is substantially rigid along the direction of fluid pressure so that fluid pressure tends to force the back-up member radially outward against the surface along which the seal slides to prevent extrusion of the resilient sealing means and to reduce frictional loss due to the small contact area of the resilient sealing member and the fact that a large part of the forces which are transmitted through the pressure seal to the surface along which the seal slides are transmitted through the material of the back-up ring which has a low coefficient of friction.

References Cited in the file of this patent
UNITED STATES PATENTS

| | | |
|---|---|---|
| 2,250,011 | Dayton | July 22, 1941 |
| 2,427,789 | Kehle | Sept. 23, 1947 |
| 2,437,814 | Hallen | Mar. 16, 1948 |
| 2,456,356 | Aber | Dec. 14, 1948 |
| 2,494,598 | Waring | Jan. 17, 1950 |
| 2,520,306 | Detweiler | Aug. 29, 1950 |
| 2,533,531 | Stephens | Dec. 12, 1950 |
| 2,587,091 | Barnes | Feb. 26, 1952 |